United States Patent
Fujinawa et al.

(10) Patent No.: US 7,555,754 B2
(45) Date of Patent: Jun. 30, 2009

(54) INFORMATION COLLECTION METHOD AND SYSTEM

(75) Inventors: Osamu Fujinawa, Kashiwazaki (JP); Katsuya Yamasaki, Shinjuku-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 717 days.

(21) Appl. No.: 10/866,020

(22) Filed: Jun. 14, 2004

(65) Prior Publication Data

US 2005/0144623 A1    Jun. 30, 2005

(30) Foreign Application Priority Data

Dec. 24, 2003  (JP) ............................. 2003-427513

(51) Int. Cl.
- *G06F 3/00* (2006.01)
- *G06F 9/44* (2006.01)
- *G06F 9/46* (2006.01)
- *G06F 13/00* (2006.01)
- *G06F 11/00* (2006.01)

(52) U.S. Cl. ......................................... 719/318; 714/44

(58) Field of Classification Search .................... 714/44, 714/48, 57; 719/318; 709/206; 399/9–37
See application file for complete search history.

(56) References Cited

U.S. PATENT DOCUMENTS

| | | | | |
|---|---|---|---|---|
| 6,317,848 B1 * | 11/2001 | Sorens et al. | ................. | 714/48 |
| 6,526,524 B1 * | 2/2003 | Kelley | ......................... | 714/38 |
| 6,622,266 B1 * | 9/2003 | Goddard et al. | ............... | 714/44 |
| 6,892,330 B2 * | 5/2005 | Lee | ............................. | 714/48 |
| 7,209,965 B2 * | 4/2007 | Sato | ........................... | 709/224 |
| 7,269,763 B2 * | 9/2007 | Maehara | ...................... | 714/48 |
| 2002/0143917 A1 * | 10/2002 | Stevenson et al. | ........... | 709/223 |
| 2003/0120775 A1 * | 6/2003 | York | ......................... | 709/224 |

FOREIGN PATENT DOCUMENTS

| | | |
|---|---|---|
| CN | 1329315 A | 1/2002 |
| JP | A-05-233493 | 9/1993 |
| JP | A-06-222956 | 8/1994 |
| JP | A-08-202509 | 8/1996 |

* cited by examiner

*Primary Examiner*—Li B Zhen
*Assistant Examiner*—Qing-Yuan Wu
(74) *Attorney, Agent, or Firm*—Oliff & Berridge, PLC

(57) ABSTRACT

An information collection method for collecting information about an event occurred in a peripheral device, comprising: preparing an e-mail for notifying about the event, sending the e-mail to a server, analyzing the e-mail by the server and collecting information about the event.

2 Claims, 12 Drawing Sheets

| Event Name | Contents of Sent E-mail |
|---|---|
| Cover Open | Occurrence of CO:Date & Time:Device Name ··· |
| No Paper | Occurrence of NP:Date & time:Device Name ··· |
| Paper Jam | Occurrence of PJ:Date & Time:Device Name ··· |
| : | : |

FIG.4

INFORMATION COLLECTION METHOD AND SYSTEM

BACKGROUND OF THE INVENTION

1. Field of the Invention

The present invention relates to an information collection method and system, and more particularly to an information collection method capable of providing information appropriate for a user depending on a state of using a consumable item such as printer toner, and a system therefor.

2. Description of Related Art

PCs (personal computers) are being used in various places such as offices and homes and often used with peripheral devices such as a printer, a scanner and the like connected through a LAN (local area network), a USB (universal serial bus) or the like.

Such peripheral devices inform a host computer, such as a personal computer controlling the peripheral devices, of the operational conditions, the occurrence of abnormality, or the like. For example, a printer notifies an abnormality, such as a lack of paper, a paper jam or a lack of toner, and the progress of a print job (printer's operational conditions).

It is known to provide a system and a device which enable to control a printer easily regardless of a distance by using e-mail to notify the host computer of the occurrence of an abnormality or the operational conditions of the peripheral devices.

And, it is known to provide a device which performs remote maintenance by sending a maintenance command as e-mail from a control PC, which controls plural personal computers connected to a network, to the personal computer being controlled.

SUMMARY OF THE INVENTION

The present invention provides an information collection method by which a manufacturer can obtain information produced in a peripheral device such as a printer, and a system therefor.

An aspect of the present invention provides an information collection method for collecting information about an event occurred in a peripheral device, including: preparing an e-mail for notifying about the event, sending the e-mail to a server, analyzing the e-mail by the server, and collecting information about the event.

Another aspect of the present invention provides an information collection system for collecting information about an event occurred in a peripheral device, including: a host apparatus that manages the peripheral device having a preparation unit that prepares an e-mail to notify about the event and an e-mail sending unit that sends the e-mail to a server, and the server having an e-mail receiving unit that receives the e-mail and an e-mail analysis unit that analyzes the e-mail and collects information about the event.

According to the present invention, information about a device such as a printer is obtained, and appropriate information can be provided to a user by, for example, issuing a warning to the user.

BRIEF DESCRIPTION OF THE DRAWINGS

Preferred embodiments of the present invention will be described in detail based on the following figures, wherein:

FIG. 4 is a diagram showing an example of a look up table;

DESCRIPTION OF THE PREFERRED EMBODIMENTS

Preferred embodiments of the present invention will be described in detail with reference to the accompanying drawings.

Figure 1:
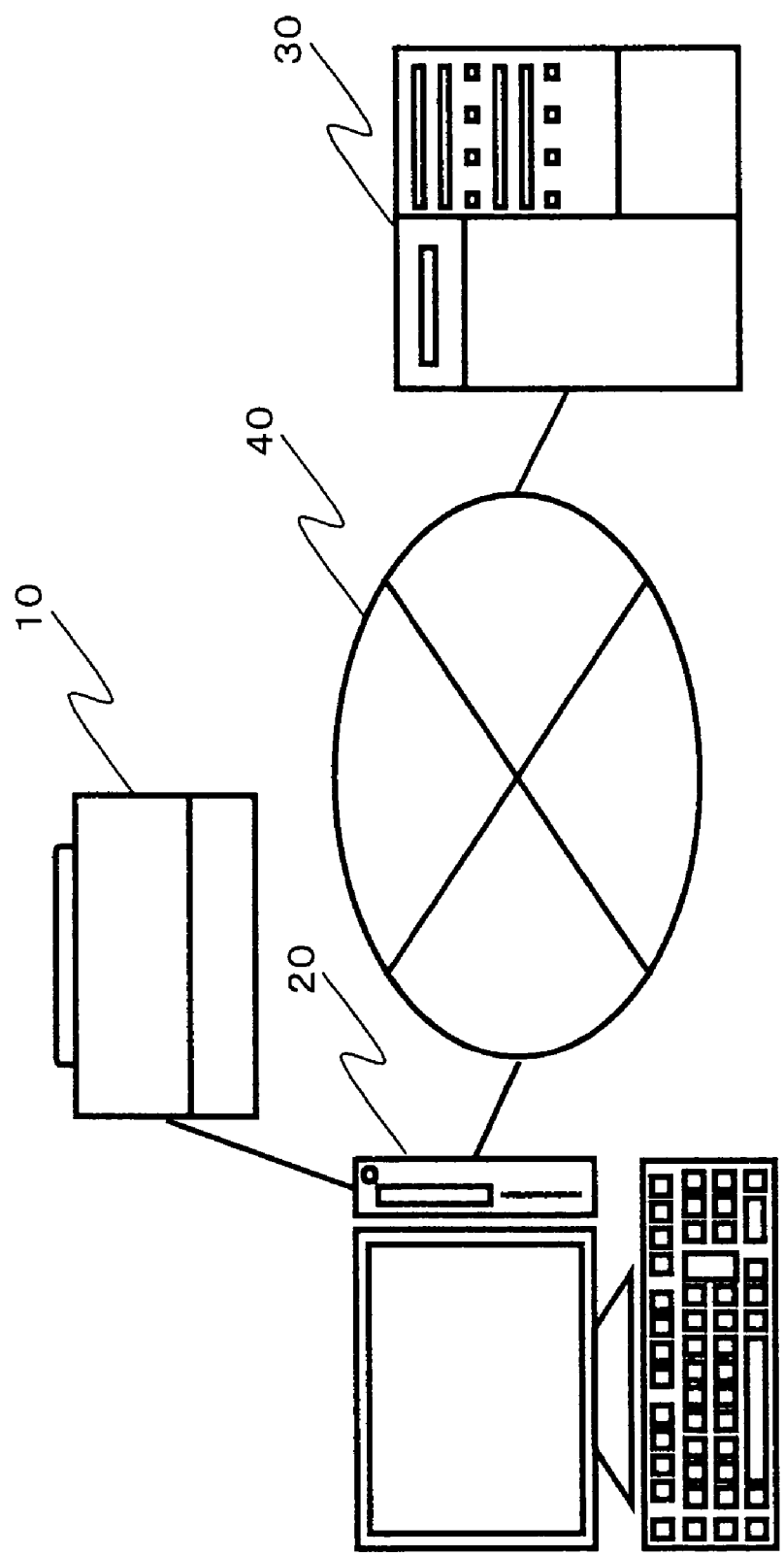
FIG. 1 is a conceptual diagram showing an example structure of an information collection system according to the present invention.

FIG. 1 is a conceptual diagram showing an example structure of the information collection system according to the present invention.

As shown in FIG. 1, the information collection system according to the present invention includes a printer 10 as a peripheral device, a PC 20 as a host apparatus for controlling peripheral devices, and a Web server 30 which is informed of events such as a lack of toner and an exchange of a cartridge occurred in the printer 10 by e-mail, where the PC 20 and the Web server 30 are connected through the Internet network 40.

Figure 2:
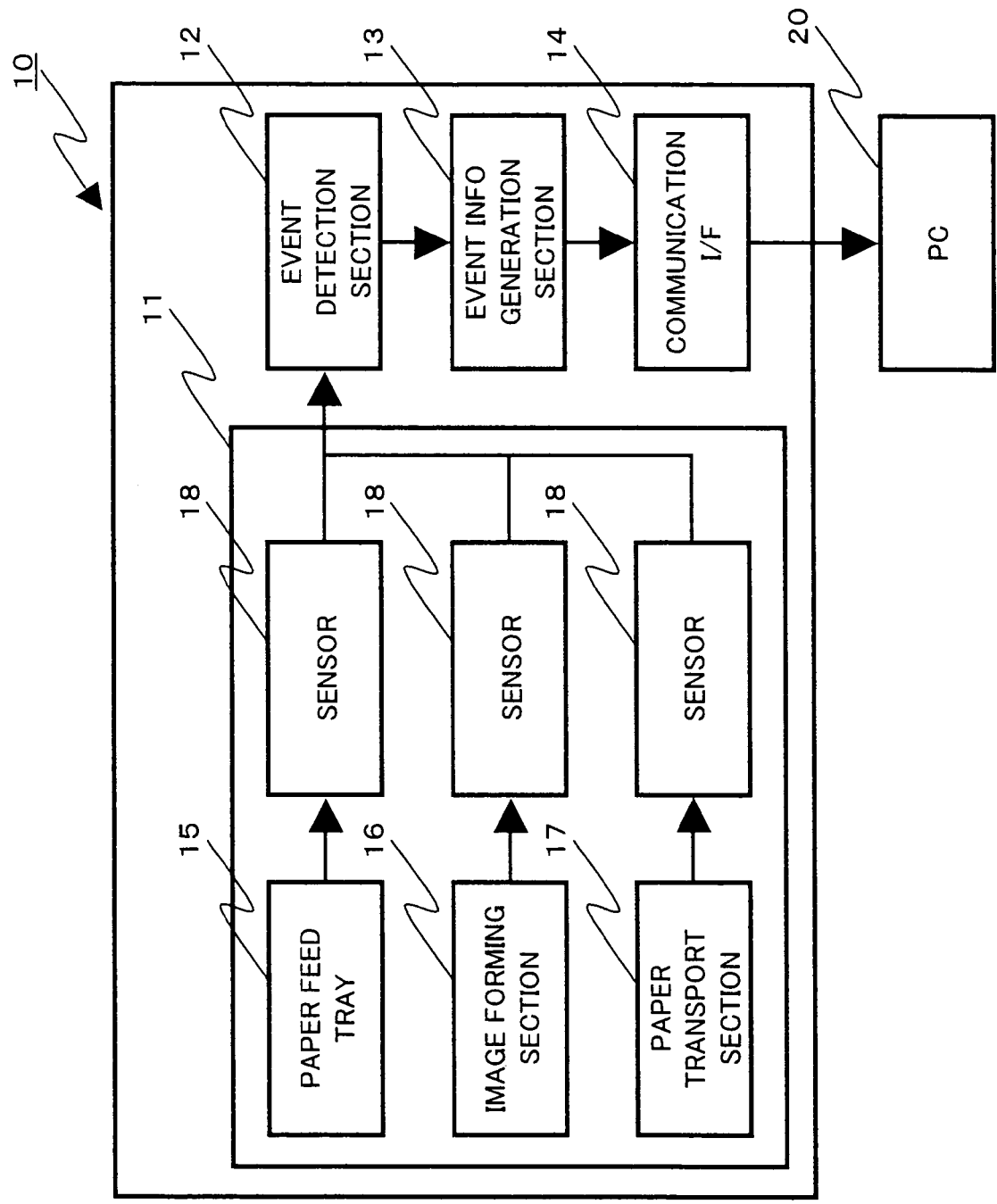
FIG. 2 is an outline functional block diagram showing an example structure of a printer according to the present invention.

FIG. 2 is an outline functional block diagram showing an example structure of the printer 10 according to the present invention.

As shown in FIG. 2, the printer 10 is provided with a print station 11 for printing out an image on paper, an event detection section 12 for detecting an event occurred in the printer, an event information generation section 13 for generating event information to notify the host apparatus PC of the event detected by the event detection section 12, and a communication interface (I/F) 14 for sending the event information to the PC 20.

The print station 11 is provided with a paper feed tray 15 for storing paper on which an image is printed, an image forming section 16 for forming an image by printing out the image on paper, a paper transport section 17 which transports paper stored in the paper feed tray 15 to the image forming section 16 and ejects the image-printed paper out of the printer 10.

The paper feed tray 15, the image forming section 16, the paper transport section 17 and a cover opening section (not shown) at various positions of the printer 10 are provided with sensors 18 for detecting abnormalities such as a paper jam, a lack of toner, cover opening and the like.

Here, the event detection section 12 detects an event by the sensors 18, and the events detected by the event detection section 12 include recoverable alarms (cover opening, paper jam, out of paper, etc.), unrecoverable alarms (a hardware (HW) failure, a communication failure and the like), and consumable item information (no/low remaining amount of toner, a drum unit life, an EP cartridge life, etc.).

The event information generation section 13 edits detailed information about the event detected by the event detection section 12 to prepare event information. For example, when a paper jam occurs, the event information generation section 13 prepares event information to notify where paper is jammed and, when a cover is left open, it prepares event information to notify which cover is open.

At this time, information such as a printer identification number (ID), a model number, a type and the like used for identification may be added to the event information.

And, the printer according to the present invention having detected the occurrence of an event prepares event information for notifying the event to the host apparatus PC and sends the event information to the PC.

Figure 3:
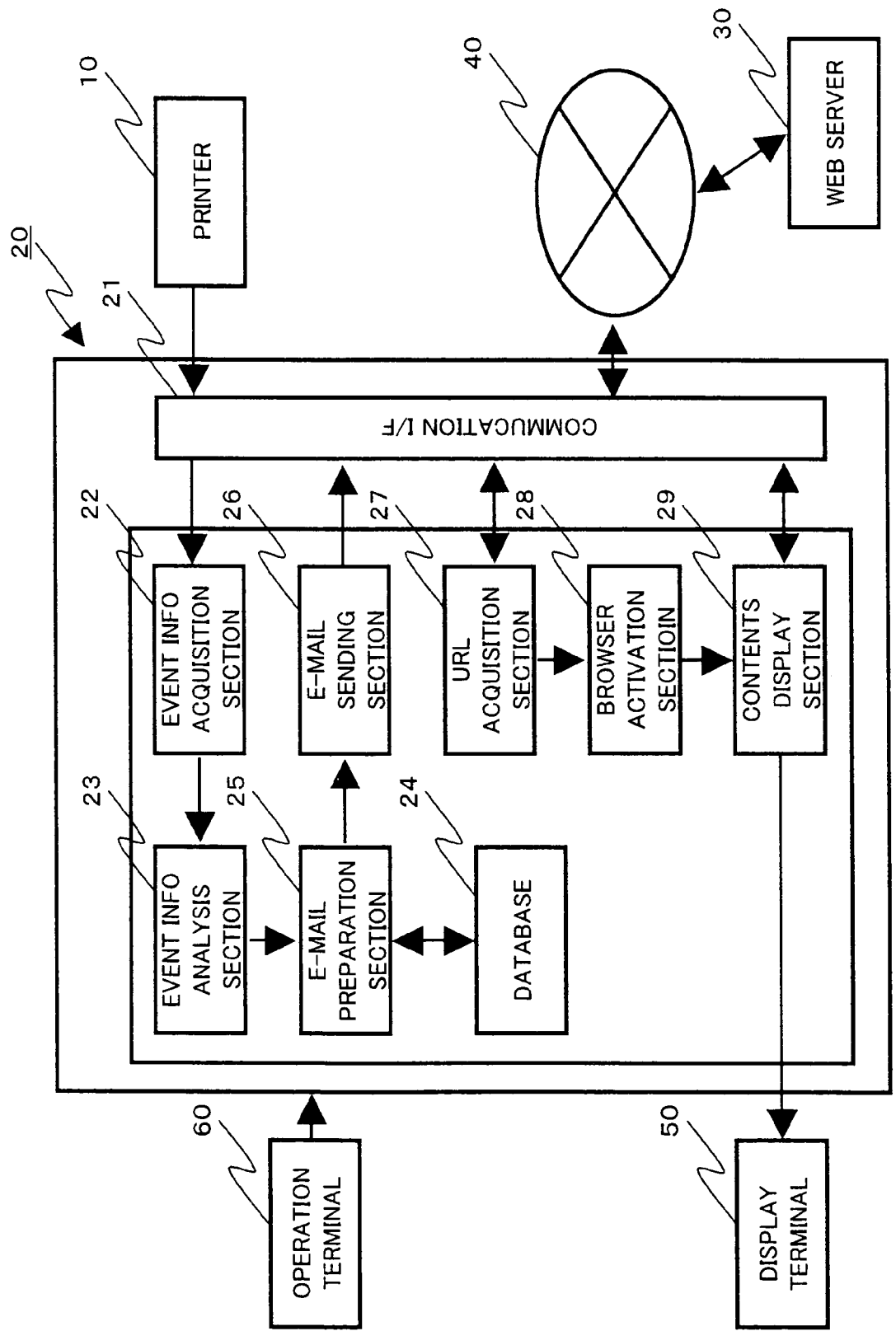
FIG. 3 is an outline functional block diagram showing an example structure of a PC according to the present invention.

FIG. 3 is an outline functional block diagram showing an example structure of the PC 20 according to the present invention.

As shown in FIG. 3, a display terminal 50 such as a display and operation terminals 60 such as a keyboard and a mouse are connected to the PC 20.

And, there are disposed a communication I/F 21 for sending/receiving event information or the like, an event information acquisition section 22 for receiving event information, an event information analysis section 23 for analyzing the event information, a database 24 where the contents of e-mail written depending on an event are recorded, an e-mail preparation section 25 for preparing e-mail, an e-mail sending section 26 for sending e-mail, a URL acquisition section 27 for obtaining an URL sent from the Web server 30, a browser activation section 28 for activating a Web browser, and a content display section 29 for displaying the contents, which are shown on a Web page, on the display terminal 50.

Here, the event information analysis section 23 analyzes event information and judges whether the event is notified to the Web server. For example, an event to be notified to the Web server is previously determined and, when the event indicated by the event information received from the printer is pertinent, it is judged to prepare e-mail.

For example, the database 24 records a look up table which correlates the event notified as the event information with the contents to be written in e-mail as shown in FIG. 4.

The e-mail preparation section 25 prepares e-mail corresponding to the event occurred in the printer 10 based on the look up table recorded in the database 24.

The e-mail sending section 26 sends the e-mail prepared by the e-mail preparation section 25 to the Web server 30 through the communication I/F 21 and the Internet network 40.

The content display section 29 accesses the Web page of the URL obtained by the URL acquisition section 27 through the communication I/F 21 and the Internet network 40 and uses the contents such as animations, voice and text to display the information, which is provided by the Web page, on the display terminal 50 or a peripheral device (not shown).

As a method of displaying the contents, for example, a method of displaying by popping up a display screen (Window) may be employed.

And, the contents are displayed on the display terminal or a peripheral device and/or instead of displaying, information about printable contents such as texts and still images may be sent to the peripheral device such as a printer to print out the information provided on the Web page.

The PC according to the present invention having received the event information analyzes the event information and judges whether the event is notified to the Web server. When it is judged that the event is notified, the PC refers to the look up table recorded in the database, prepares e-mail and sends it to the Web server.

Upon obtaining the URL, the PC activates the Web browser, accesses the obtained URL and displays the contents, which are shown on the Web page, on the display terminal.

Figure 5:
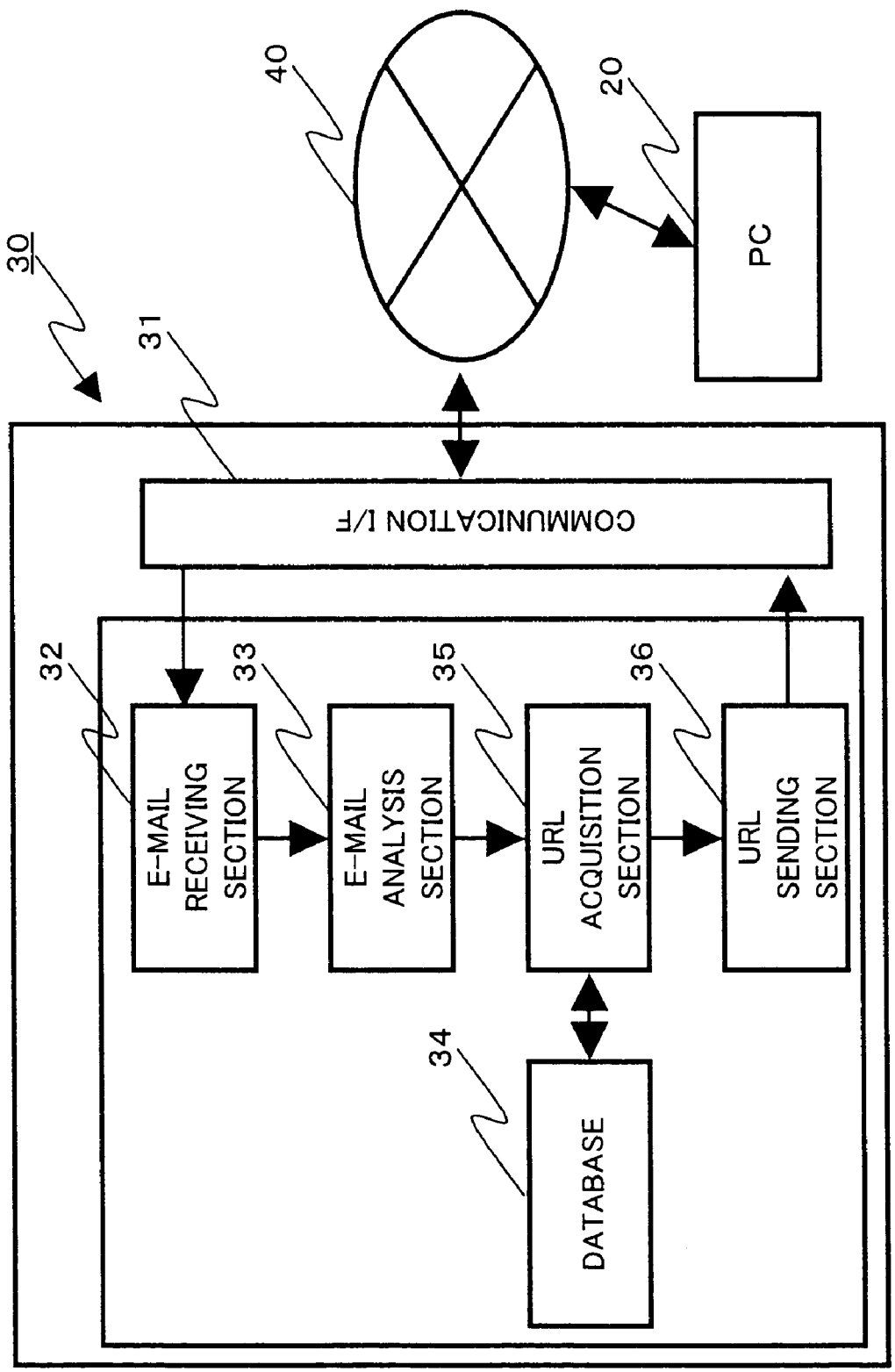
FIG. 5 is an outline functional block diagram showing an example structure of a Web server according to the present invention.

FIG. 5 is an outline functional block diagram showing an example structure of the Web server 30 according to the present invention.

As shown in FIG. 5, the Web server 30 is provided with a communication I/F 31 for sending/receiving event information or the like, an e-mail receiving section 32 for receiving e-mail, an e-mail analysis section 33 for analyzing e-mail, a database 34 for recording an event in correspondence with the URL of a Web page showing information to be provided to a user, a URL acquisition section 35 for obtaining a URL from the database 34 and a URL sending section 36 for sending a URL to the PC 20 by a known way such as e-mail.

Here, the e-mail analysis section 33 detects an event according to information contained in the e-mail to recognize the event occurred in the peripheral device and stores an event name and information such as the date and time of the occurrence of the event notified by the e-mail in a storage section (not shown).

And, the Web server according to the present invention having received the e-mail analyzes the information written in the received e-mail to detect the event. The URL of the Web page corresponding to the event is obtained from the database and sent to the PC.

When an event occurs in the printer, the information collection system according to the present invention configured as described above prepares event information for notifying the event and sends it to the host apparatus PC.

The PC analyzes the received event information and judges whether the event is notified to the Web server. When it is judged that the event is notified, the PC prepares e-mail to notify the event and sends it to the Web server.

The Web server judges the URL of the Web page showing the information to be provided to the user according to the e-mail and received information and sends the URL to the PC.

Upon receiving the URL, the PC activates the Web browser to access the obtained URL and displays the contents, which are shown on the Web page, on the display terminal.

Figure 6:
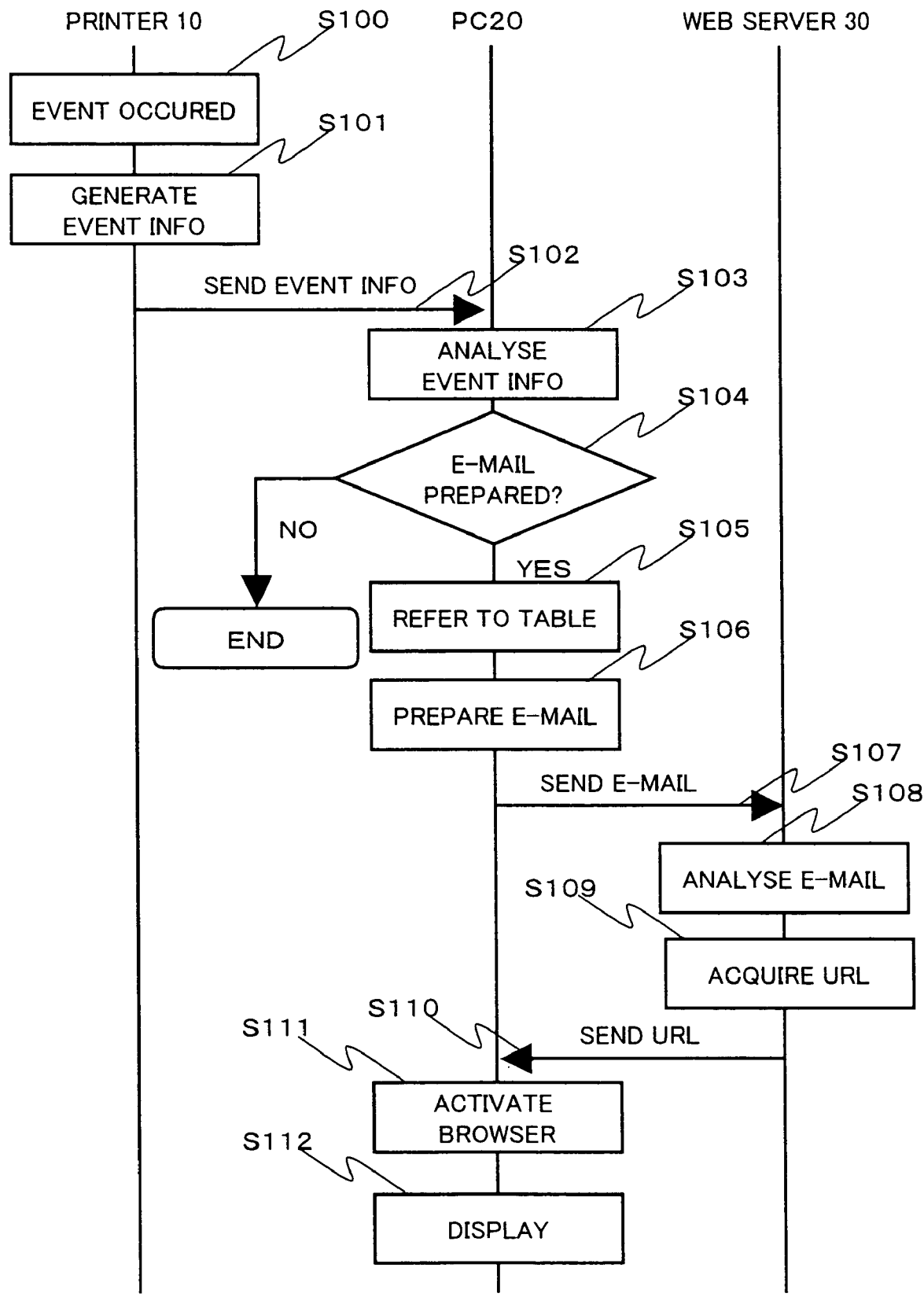
FIG. 6 is a flow chart showing an example flow of information provided according to the present invention.

FIG. 6 is a flow chart showing a flow of the information collection method according to the present invention.

First, when an event occurs in the printer 10 (step 100), event information corresponding to the occurred event is prepared (step 101) and sent to the PC 20 (step 102).

The PC 20 analyzes the received event information (step 103) and judges whether the event is notified (step 104). When it is judged not to notify (NO in step 104), the processing is terminated, but when it is judged to notify the event (YES in step 104), the PC 20 refers to the look up table (step 105), prepares e-mail to notify about the event (step 106) and sends the e-mail to the Web server (step 107).

The Web server 30 analyzes the received e-mail (step 108) and obtains the URL of the Web page showing the contents to be provided to the users according to the event (step 109).

And, the URL is sent to the PC 20 (step 110), and the PC 20 activates the browser (step 111) and displays the contents, which are shown on the Web page of the received URL, on the display terminal (step 112).

The contents are displayed on the display section and/or instead of displaying, the information shown on the Web page may be printed out by sending to a peripheral device such as a printer which can output it.

Thus, the event occurred in the peripheral device is notified to the Web server by e-mail in this embodiment, so that the manufacturer can use the Web server to know the event occurred in the peripheral device and detail information such as the occurred date and time.

According to the event occurred in the peripheral device, the URL of the Web page showing the appropriate information is sent to the PC to show the Web page of this URL, enabling to take measures such as warning to the user.

According to the present invention, the sensors disposed at the individual positions of the printer are used to detect any event by the event detection section, but plural different events can be used to detect a new event.

In a first embodiment, an event about the number of printed paper and an event about a remaining amount of toner are used to detect an event that it is highly possible that a toner cartridge is charged with toner.

Figure 7:
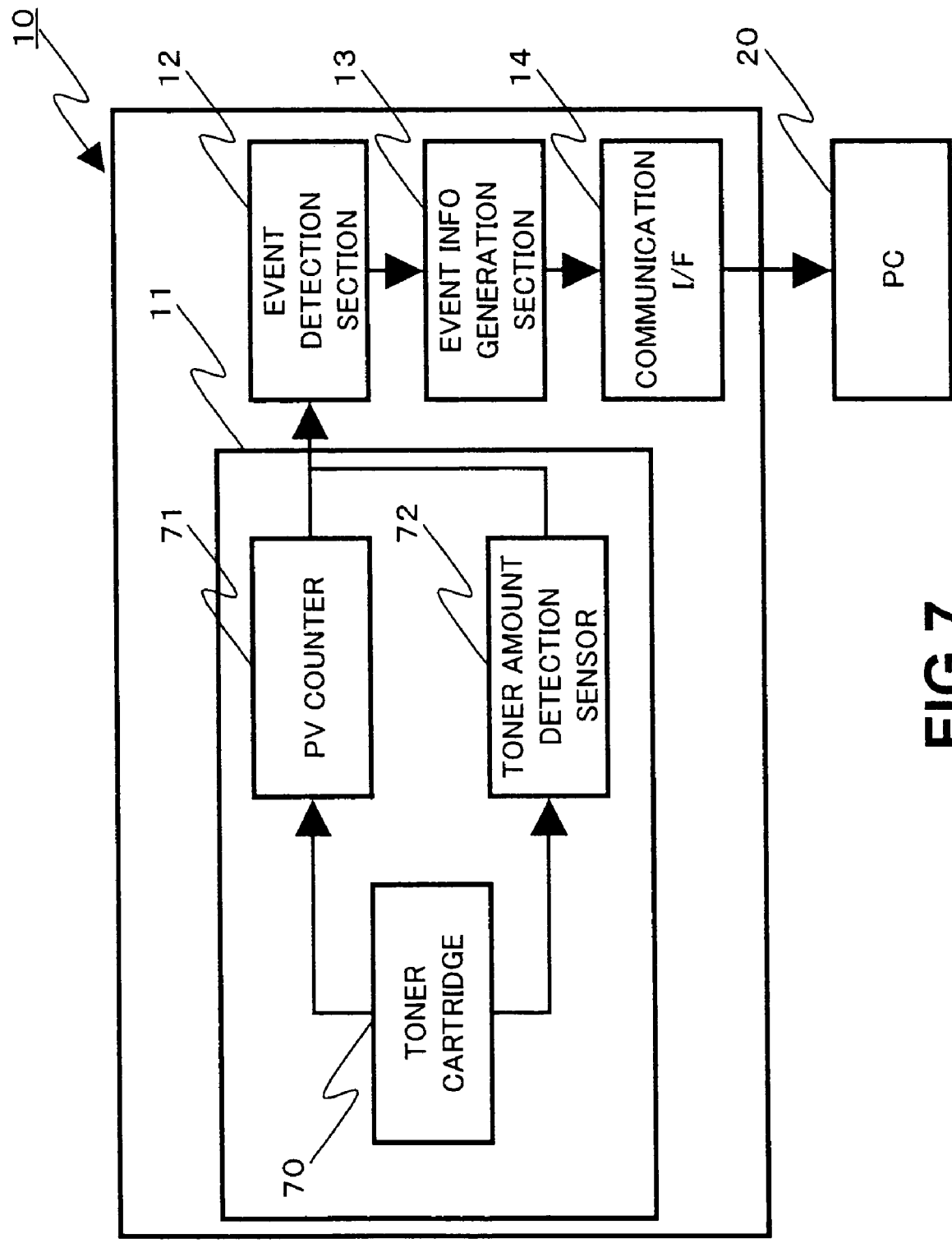
FIG. 7 is an outline functional block diagram showing an example structure of a printer according to a first embodiment.

FIG. 7 is an outline functional block diagram showing an example structure of the printer 10 of the first embodiment. The same numerals as those used in FIG. 2 are allotted to parts having the same functions as those of the printer shown in FIG. 2, and their detail descriptions are omitted.

As shown in FIG. 7, the printer 10 is provided with a toner cartridge 70 for storing toner used by the print station 11, a PV (print volume) counter 71 for counting the number of printed paper, and a remaining toner amount detection sensor 72 for detecting a remaining amount of toner.

Here, the PV counter 71 is a counter recorded in a nonvolatile memory attached to the toner cartridge 70 and records the number of printed paper resulted from printing by using the toner cartridge. Therefore, when a new toner cartridge is used, the PV counter is initialized.

When the remaining toner amount detection sensor 72 judges that a remaining amount of toner stored in the toner cartridge 70 is lower than a predetermined value, it detects an event "small remaining amount of toner" indicating that the remaining amount of toner is small.

The event detection section 12 is set to have a desired value for judging that an event has occurred if the count number of the PV counter 71 exceeds the desired value, and when an event occurred in the PV counter and an event "small remaining toner amount" are detected, an event of a high possibility that the toner cartridge needs to be charged with toner is detected.

The printer according to this embodiment detects an event that a possibility of charging the toner cartridge with toner is high from the count value of the PVC counter and the remaining toner amount and notifies the detection of the event to the PC.

Figure 8:
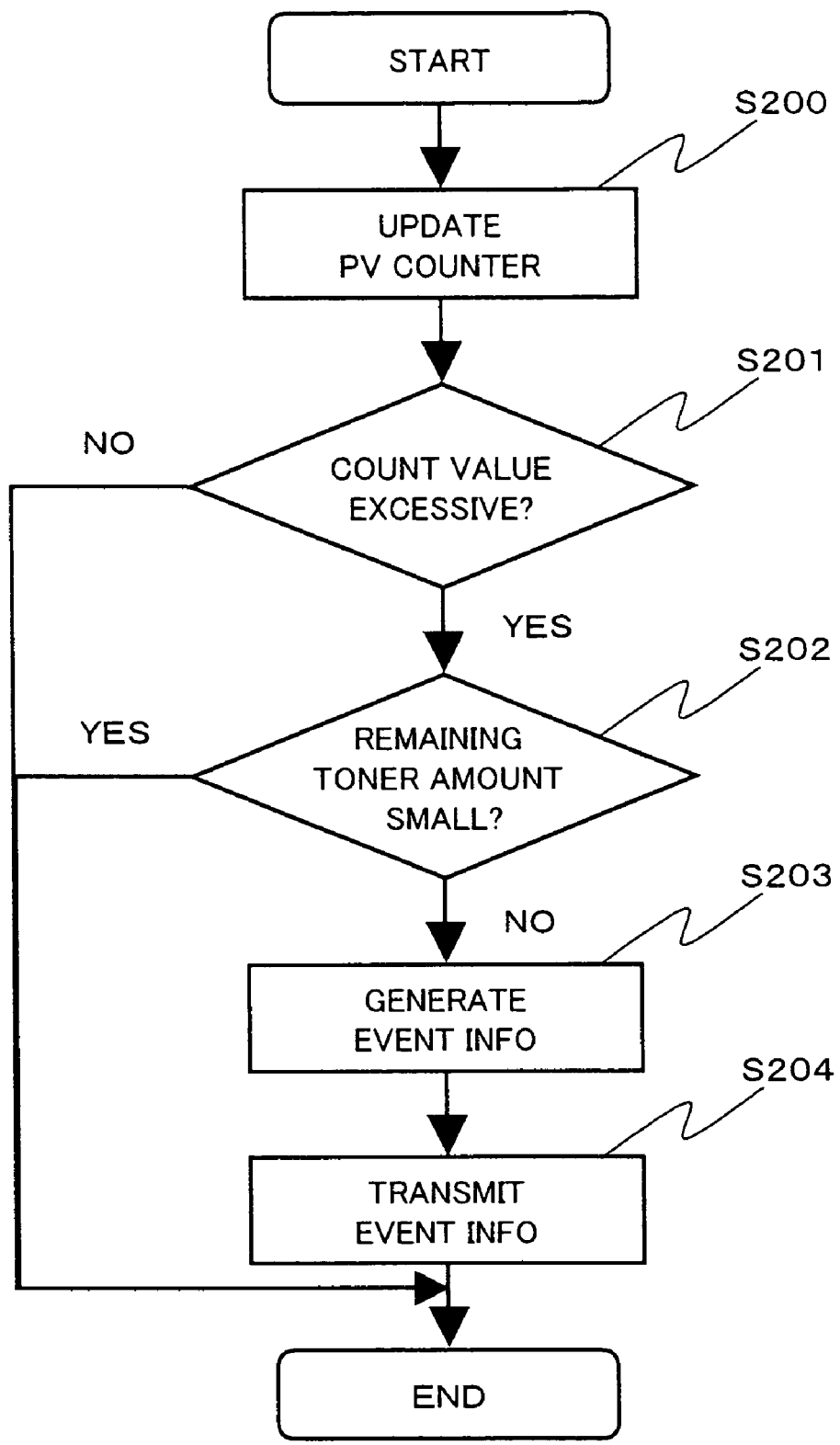
FIG. 8 is a flow chart showing the processing of the printer according to the first embodiment.

FIG. 8 is a flow chart showing a flow of processing to detect an event by a printer and to notify the detected event to the PC.

First, the PV counter is updated when printing is executed or the like (step 200), then it is judged whether the count value has exceeded a prescribed value (step 201), when it is judged that the count value is not more than the prescribed value (NO in step 201), the processing is terminated; when it is judged that the count value has exceeded the prescribed value (YES in step 201), it is judged whether an event that a remaining amount of toner is small (the remaining amount of toner is less than the prescribed value) is detected (step 202).

And, when it is judged that the event of a small remaining amount of toner is detected (YES in step 202), the processing is terminated, but when it is judged that the event of a small remaining amount of toner is not detected (NO in step 202), event information is prepared (step 203), and the event information is sent to the PC (step 204).

In this embodiment, an event that the number of printed paper has exceeded the prescribed value and an event that the remaining amount of toner is not small can be used to detect an event that a possibility that the toner cartridge is charged with toner is high.

Therefore, it is not necessary to dispose a new sensor for monitoring the charging of toner, and a production cost can be cut.

Because the event that the possibility of charging the toner is high can be notified from the PC to the Web server, the manufacturer can send from the Web server to the PC the URL of a Web page showing that, for example, even if a used toner cartridge which is replenished with toner by the user has degraded print quality or caused a trouble in the printer, such a problem cannot be compensated by the manufacturer and a disadvantage for the user may be caused. Thus, a warning can be given to the user to provide the user with information appropriate depending on the events.

In this embodiment, the event of charging the toner is detected by the printer but, for example, the count value of the PV counter and the remaining toner amount may be notified to and compared by the PC to detect an event.

When the PV counter is updated, it is judged whether the count value of the PV counter has exceeded the prescribed value, but the judgment whether an event of the count value has occurred may be initiated by another occasion such as turning on of the printer.

A new event is detected by using plural different events in the first embodiment, however, it is also possible to judge information to be provided to the user according to plural different events.

In a second embodiment, an event about the count value of the PV counter and an event about a product ID as identification information about the printer are notified to the Web server. These events and an event already obtained by the Web server are used to judge information to be provided to the user.

Figure 9:
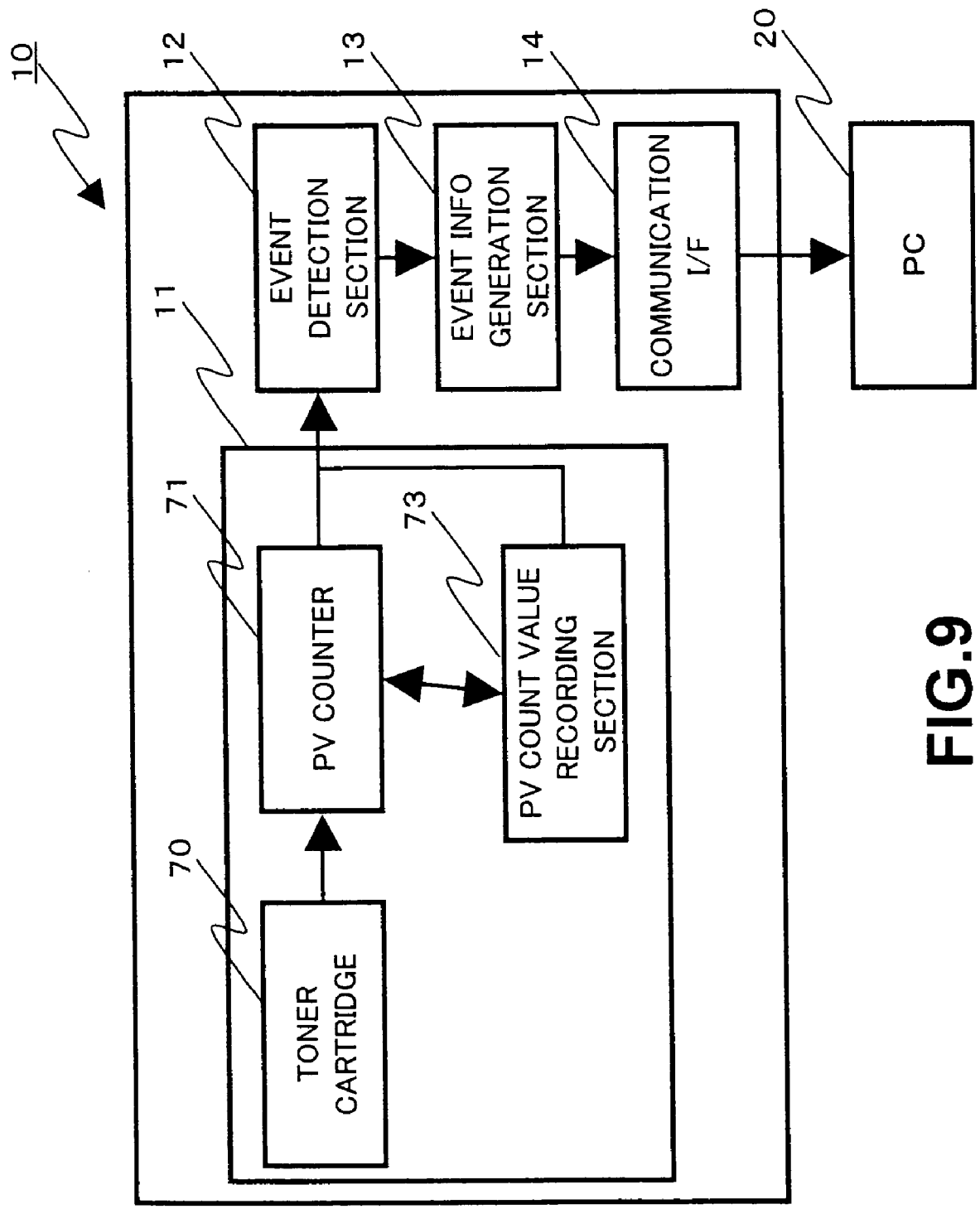
FIG. 9 is an outline functional block diagram showing an example structure of the printer according to a second embodiment.

FIG. 9 is an outline functional block diagram showing an example structure of the printer 10 according to the second embodiment. The same numerals as those used in FIG. 2 and FIG. 7 are allotted to parts having the same functions as those of the printers shown in FIG. 2 and FIG. 7, and their detail descriptions are omitted.

As shown in FIG. 9, the printer 10 is provided with a PV count value recording section 73 for recording the count value counted by a PV counter 71.

Here, when the PV counter 71 is cleared, the event detection section 12 judges that an event has occurred.

The event information generation section 13 records a product ID as identification information about the printer and prepares event information to notify the count value recorded in the PV count value recording section 73 in correspondence with the product ID.

When the count value of the PV counter is updated, the printer of this embodiment records the updated count value in the PV count value recording section.

And, when it is detected that the PV counter has been cleared, event information for notifying the count value recorded in the PV count value recording section is prepared and sent to the PC.

Figure 10:
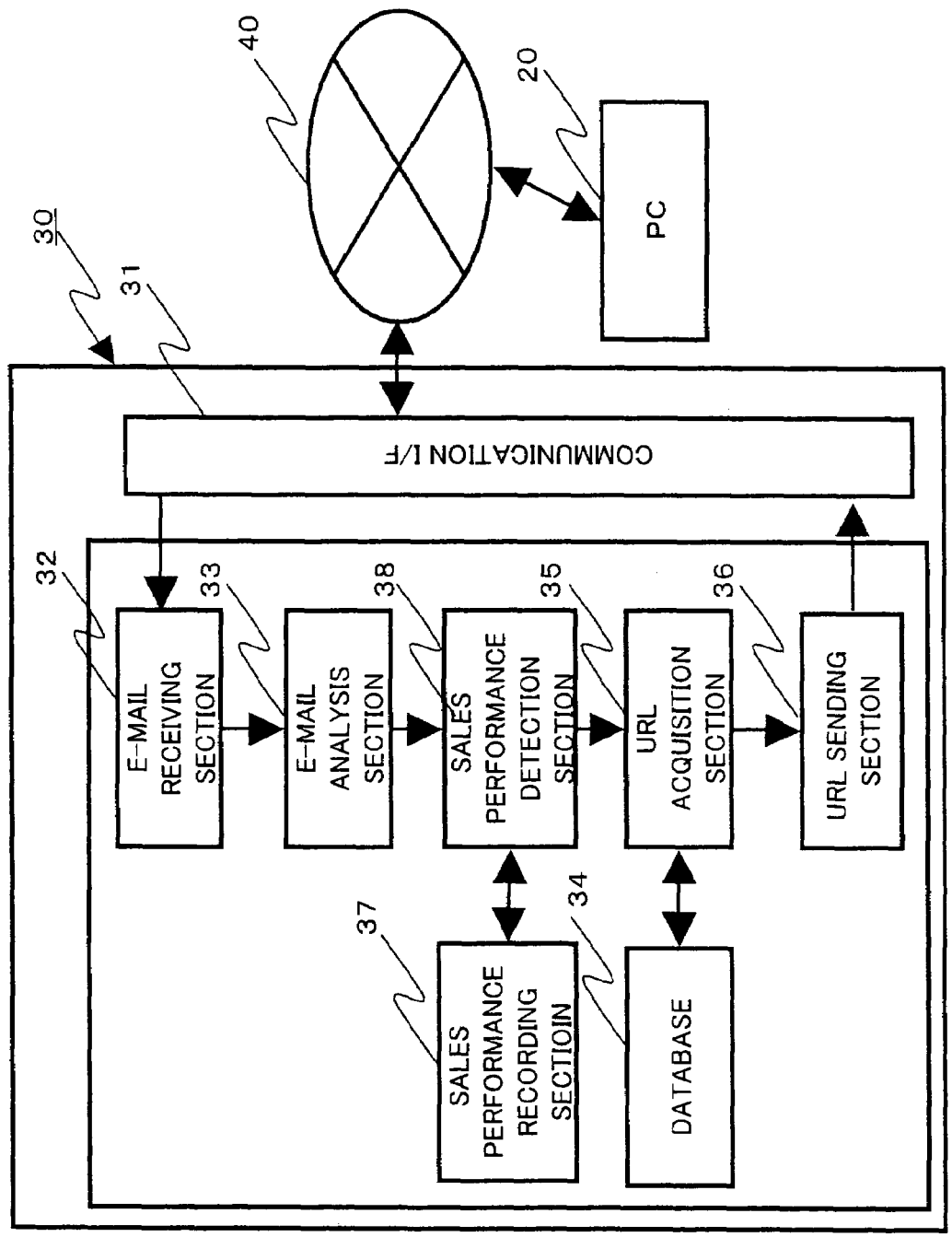
FIG. 10 is an outline functional block diagram showing an example structure of a Web server according to the second embodiment.

FIG. 10 is an outline functional block diagram showing an example structure of the Web server 30 according to the second embodiment. The same numerals as those used in FIG. 5 are allotted to parts having the same functions as those of the Web server shown in FIG. 5, and their detail descriptions are omitted.

As shown in FIG. 10, the Web server 30 is provided with a sales performance recording section 37 for recording sales performance of the toner cartridge in correspondence with the product ID of the printer and a sales performance detection section 38 for detecting sales performance based on the product ID.

URLs of plural Web pages having different information to be provided to the user are recorded in the database 34 according to the sales performance of the cartridge and the count value of the PV counter.

The Web server of this embodiment having received e-mail for transmitting an event, which notifies the count value of the PV counter, analyzes the received e-mail and detects the sales performance of the cartridge based on the product ID recorded in the e-mail.

And, a URL is obtained from the database according to the sales performance and the count value of the PV counter, and the obtained URL is sent to the PC.

Figure 11:
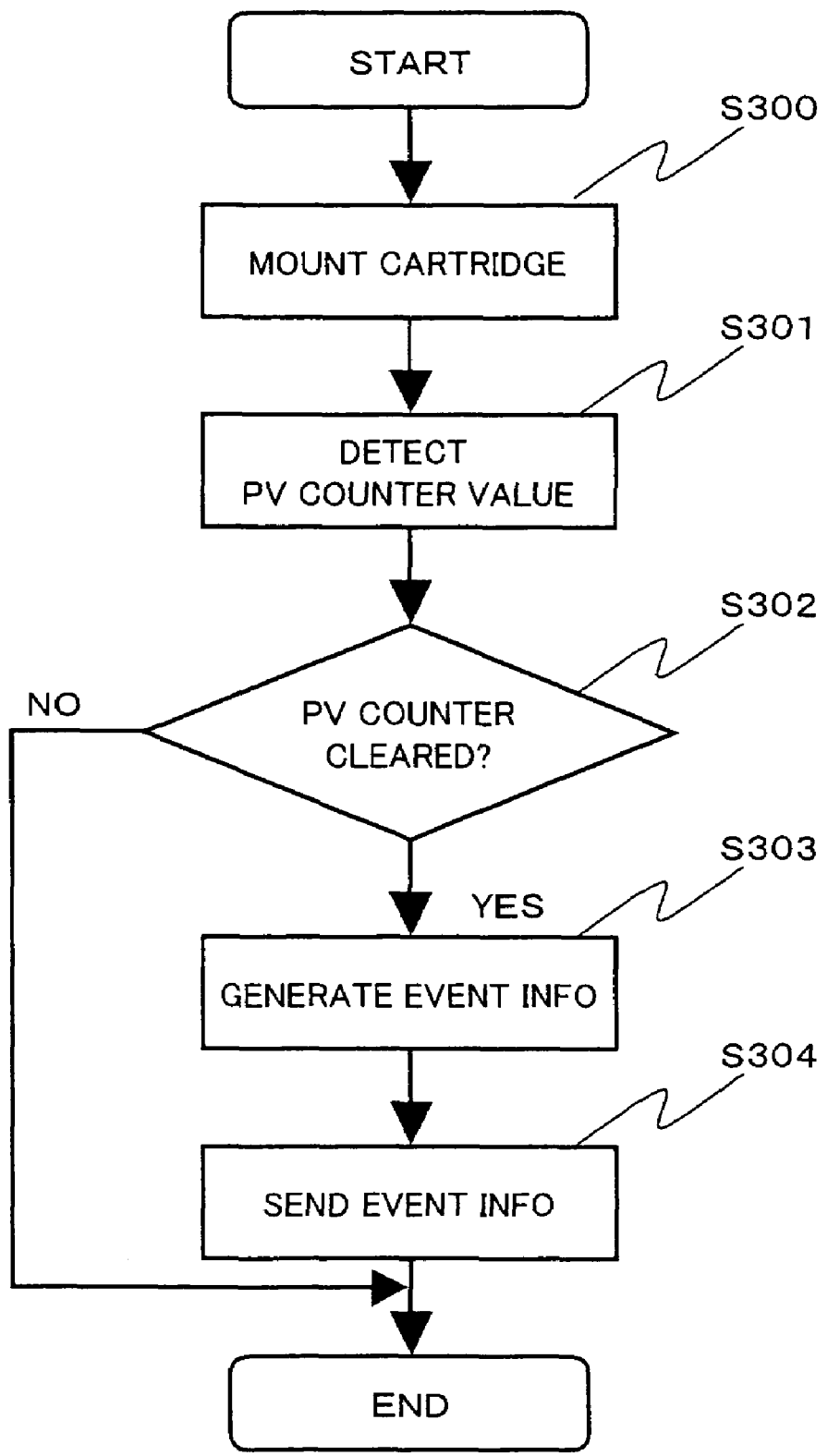
FIG. 11 is a flow chart showing the processing of the printer according to the second embodiment.

FIG. 11 is a flow chart showing a flow of processing by the printer in the second embodiment.

First, when the toner cartridge is replaced (step 300), a count value of the PV counter is detected (step 301), it is judged whether the PV counter has been cleared (step 302), when it is judged that the count value has not been cleared (NO in step 302), the processing is terminated, and when it is judged that the count value has been cleared (YES in step 302), event information for notifying the count value is prepared (step 303), and the event information is sent to the PC (step 304).

In this embodiment, it is judged that an event has occurred when the count value of the PV counter has been cleared. But, for example, it may be configured that, when the count value recorded in the PV count value recording section and the count value of the PV counter are different, it is judged that an event has occurred.

The count value of the PV counter is recorded in the PV count value recording section, but it may be configured to record the count value by the PC, to obtain event information for transmitting an event that the PV counter has been cleared from the printer by the PC, and to transmit the count value or the like recorded in the PC to the Web server by e-mail.

Figure 12:
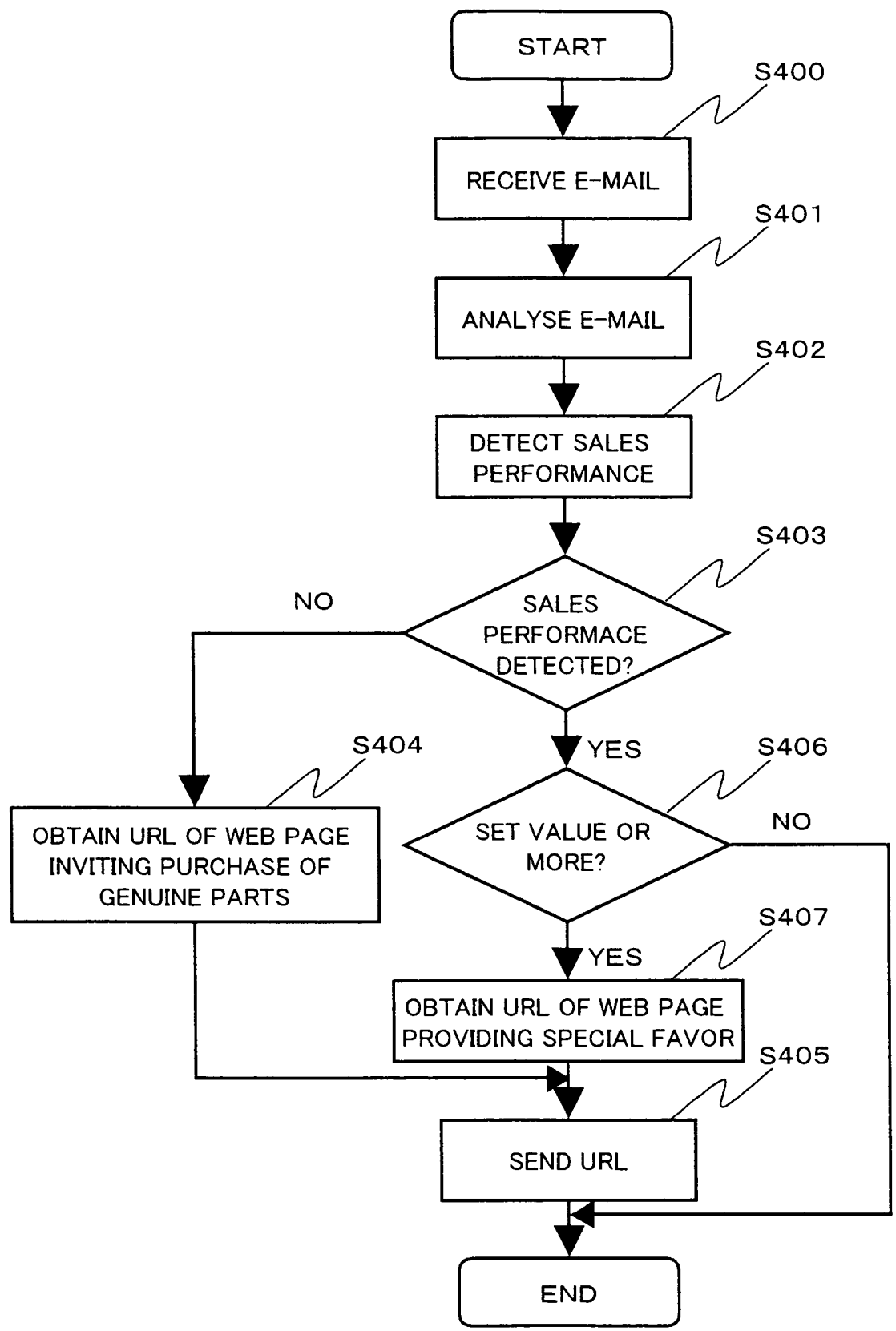
FIG. 12 is a flow chart showing the processing of the Web server according to the second embodiment.

FIG. 12 is a flow chart showing a flow of processing by the Web server according to the second embodiment.

First, when e-mail is received (step 400), the e-mail is analyzed (step 401), and sales performance is detected based on the product ID recorded in the e-mail (step 402).

Here, when it is judged that sales performance is not detected even if it is detected (NO in step 403), the URL of a Web page inviting purchase of genuine parts is obtained (step 404), and the URL is sent to the PC (step 405).

When the sales performance is detected (YES in step 403), it is judged whether the sales performance exceeds a prescribed value which has determined a desired value (step 406), and when it is judged that it does not exceed the prescribed value (NO in step 406), the processing is terminated, but when it is judged that the sales performance exceeds the prescribed value (YES in step 406), the URL of a Web page providing a special favor such as a discount when the toner cartridge or the like is purchased is obtained (step 407), and the URL is sent to the PC (step 405).

Thus, according to this embodiment, an event that the user uses a genuine toner cartridge or has a high possibility of not using it can be detected by the Web server in view of the count value of the PV counter and the sales performance of the toner cartridges.

What is claimed is:

1. An information collection method for collecting information about an event which has occurred in a peripheral device performed by a host apparatus and a server, wherein:

a process of the host apparatus comprises:

generating second event information indicating an operation status of the peripheral device on the basis of analysis results of a plurality of first event information indicating various events detected by sensors disposed at predetermined positions of the peripheral device; and sending to the server by an e-mail, when the second event information falls under a predetermined condition indicating that a notification is to be sent to the server, the notification including the plurality of first event information and the second event information together with additional information containing identification information of the peripheral device that has received the plurality of first event information and a date and a time of occurrence of each of the events, a process of the server comprises:

managing, by storing in a storage unit the plurality of first event information and the second event information notified by the e-mail received from the host apparatus, in association with the identification information of the peripheral device;

analyzing the operation status of the peripheral device corresponding to the identification information notified by the e-mail, on the basis of the plurality of first event information and the second event information notified by the e-mail and stored in the storage unit;

determining previously prepared information-to-be-provided that corresponds to the analyzed operation status and notifying the host apparatus of a storage position where the determined information-to-be-provided is stored, and the process of the host apparatus further comprises:

displaying the information-to-be-provided that is stored in the storage position notified by the server on a display terminal of the host apparatus or the peripheral device.

2. An information collection system for collecting, by a host apparatus and a server connected to a peripheral device via a network, information about an event which has occurred in the peripheral device, wherein:

the host apparatus comprises:

a receiving unit which receives, from the peripheral device via a communication unit, a plurality of first event information indicating various events detected by sensors disposed at predetermined positions of the peripheral device;

a generating unit which generates second event information indicating an operation status of the peripheral device based upon analysis results of the plurality of first event information received by the receiving unit; and an e-mail sending unit that sends to the server by an e-mail, when the second event information falls under a predetermined condition indicating that a notification is to be sent to the server, the notification including the plurality of first event information and the second event information together with additional information containing identification information of the peripheral device that has received the plurality of first event information and a date and a time of occurrence of each of the events, and, the server comprises:

a managing unit that manages, by recording in a storage unit the plurality of first event information and the second event information notified by the e-mail received from the host apparatus, in association with the identification information of the peripheral device;

an analyzing unit that analyzes the operation status of the peripheral device corresponding to the identification information notified by the e-mail, on the basis of the plurality of first event information and the second event information notified by the e-mail and stored in the storage unit;

a determination unit that determines previously prepared information-to-be-provided that corresponds to the operation status analyzed by the analyzing unit; and a notifying unit that notifies the host apparatus of a storage position where the information-to-be-provided that has been determined by the determination unit is stored.

* * * * *